No. 707,072. Patented Aug. 19, 1902.
T. H. C. BEALL.
WASHING MACHINE.
(Application filed Apr. 19, 1902.)

(No Model.) 5 Sheets—Sheet I.

Witnesses,
J. C. Duvall.
H. E. Randle.

Inventor,
Thomas H. C. Beall;
by his attorney,
Robert W. Randle.

THE NORRIS PETERS CO., PHOTO-LITHO., WASHINGTON, D. C.

No. 707,072. Patented Aug. 19, 1902.
T. H. C. BEALL.
WASHING MACHINE.
(Application filed Apr. 19, 1902.)
(No Model.)
5 Sheets—Sheet 3.

Fig. A.

Witnesses,
S. Q. Duvall.
R. E. Randle.

Inventor,
THOMAS H. C. BEALL,
by his attorney,
Robert W. Randle.

No. 707,072. Patented Aug. 19, 1902.
T. H. C. BEALL.
WASHING MACHINE.
(Application filed Apr. 19, 1902.)

(No Model.) 5 Sheets—Sheet 4.

Witnesses,
J. C. Duvall.
H. E. Randle.

Inventor,
Thomas H. C. Beall,
by his attorney,
Robert W. Randle.

No. 707,072. Patented Aug. 19, 1902.
T. H. C. BEALL.
WASHING MACHINE.
(Application filed Apr. 19, 1902.)

(No Model.) 5 Sheets—Sheet 5.

Witnesses,
J. C. Duvall.
R. E. Randle.

Inventor,
Thomas H. C. Beall,
by his attorney,
Robert W. Randle.

THE NORRIS PETERS CO., PHOTO-LITHO., WASHINGTON, D. C.

UNITED STATES PATENT OFFICE.

THOMAS H. C. BEALL, OF CICERO, INDIANA.

WASHING-MACHINE.

SPECIFICATION forming part of Letters Patent No. 707,072, dated August 19, 1902.

Application filed April 19, 1902. Serial No. 103,749. (No model.)

*To all whom it may concern:*

Be it known that I, THOMAS H. C. BEALL, a citizen of the United States, residing at Cicero, in the county of Hamilton and State of Indiana, have invented certain new and useful Improvements in Washing-Machines, of which the following is a specification which is sufficiently clear and concise to enable others skilled in the art to which it appertains to make and use the same.

My present invention relates to washing-machines, and has for its object the provision of a washing-machine which will be positive and effective in its operation and which can be manufactured and sold at a comparatively low price and at the same time can be used in a variety of ways.

Another object is to improve the construction of washing-machines to enable clothing or the like to be rapidly and thoroughly washed without liability of injuring the fabrics and with a minimum of labor expended in the operation.

Other objects and advantages will appear from the following specification and from the drawings forming a part thereof.

The invention consists in the construction and novel combination and arrangement of the several parts hereinafter fully described, illustrated in the accompanying drawings, and specifically pointed out in the claims hereunto appended.

With the above-enumerated objects in view I will now proceed to describe my invention.

Figure 1:
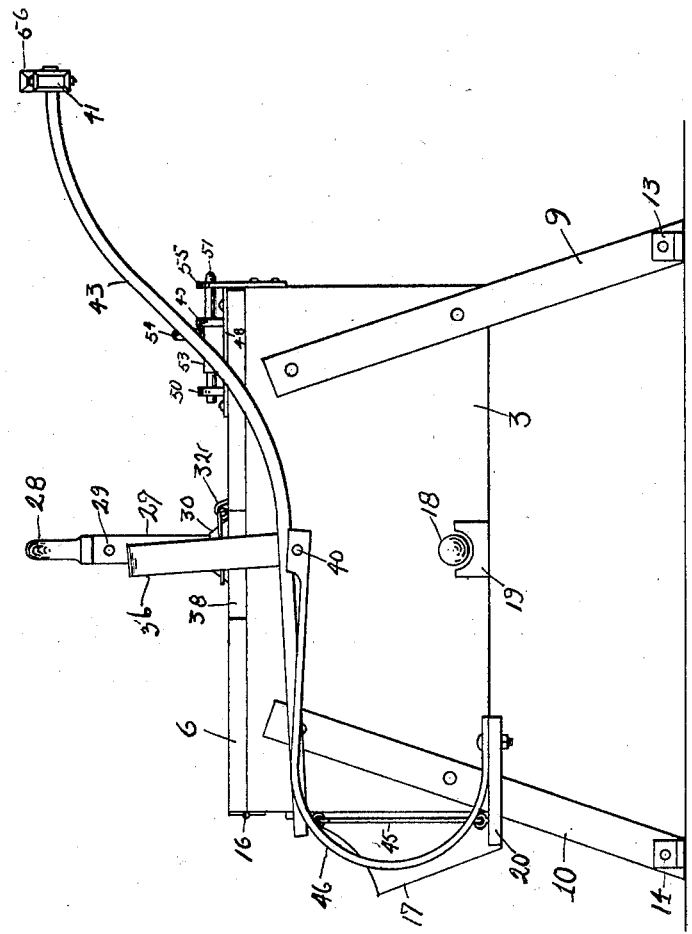
Figure 2:
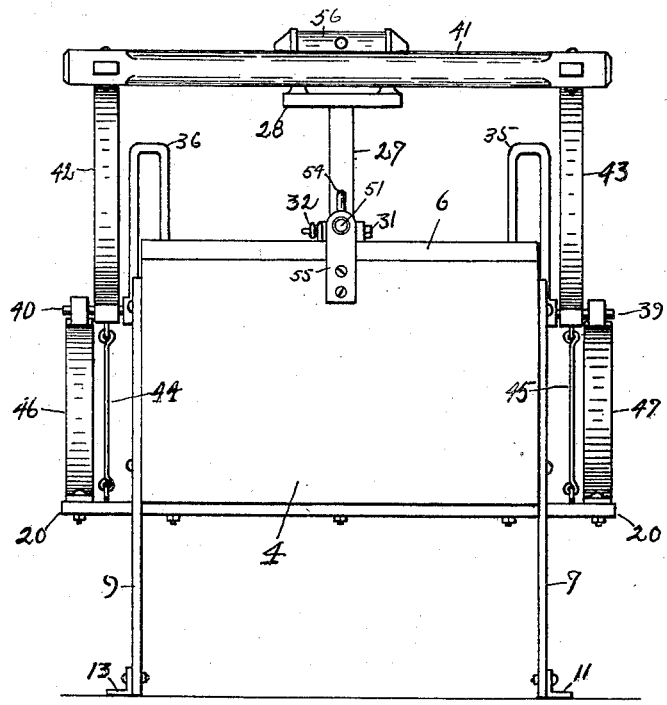
Figure 3:
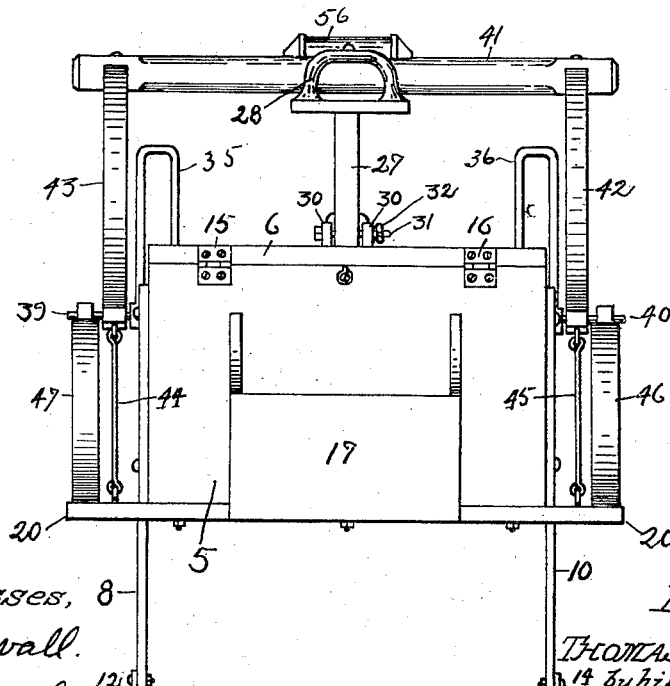
Figure 4:
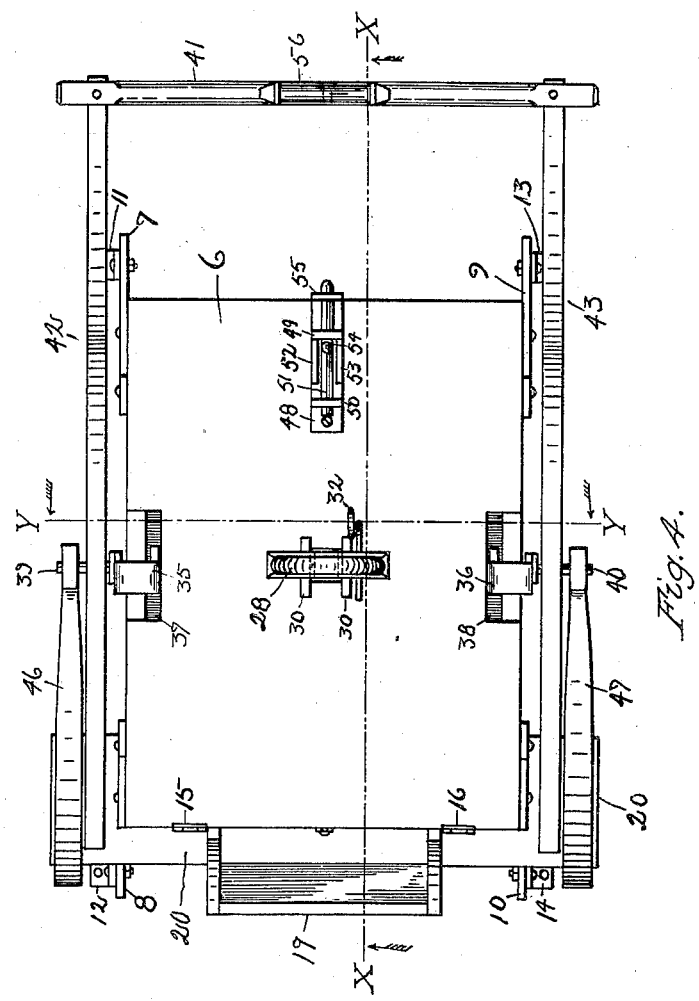
Figure 5:
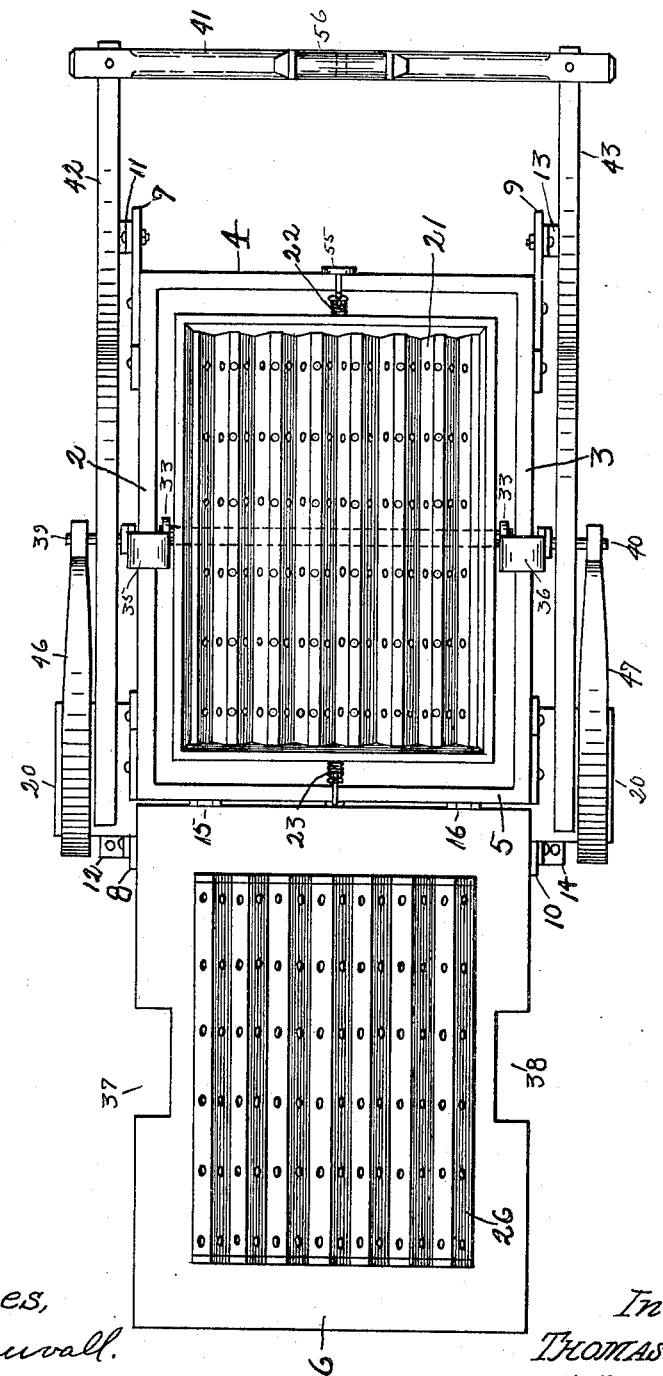
Figure 6:
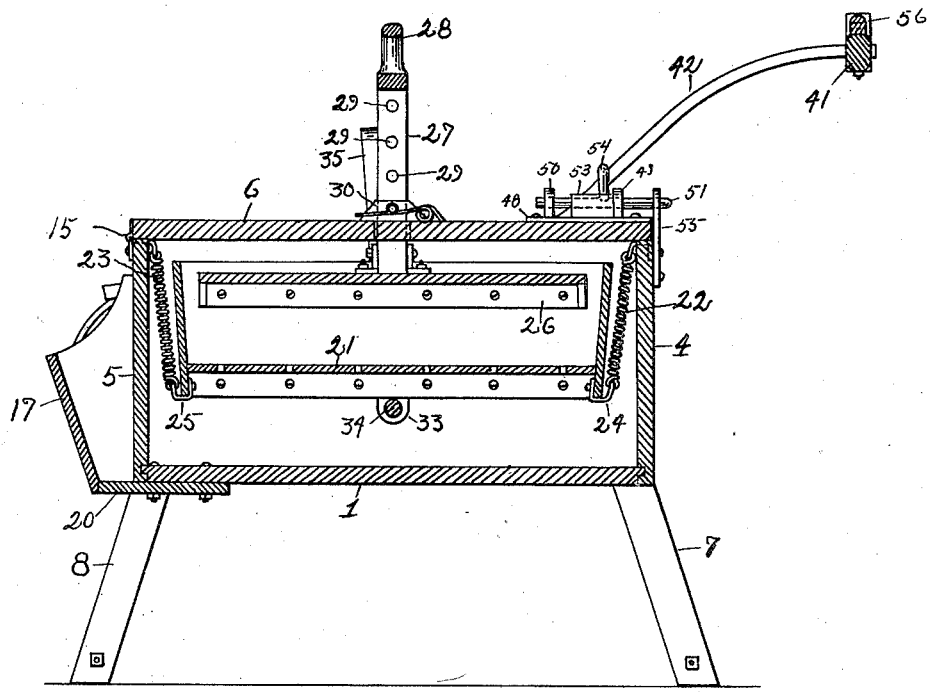
Figure 7:
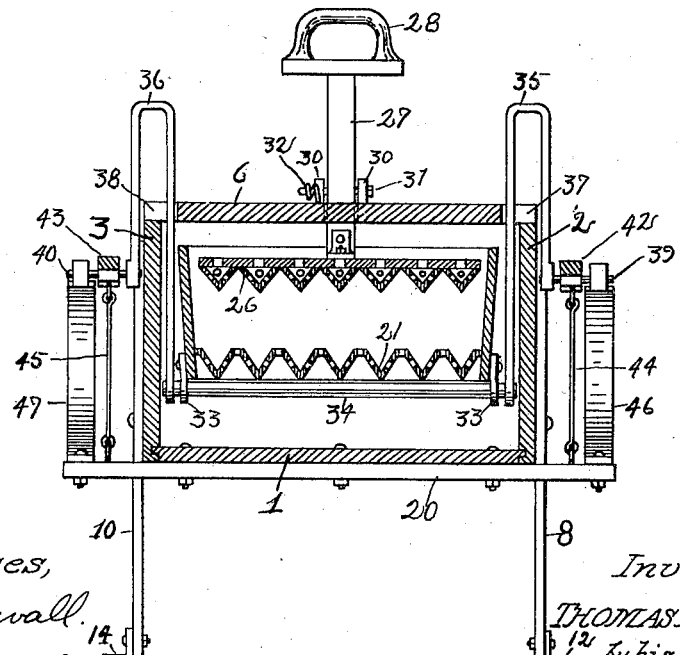

Referring to the drawings forming a part of this specification, Figure 1 shows a side elevation of my washing-machine. Fig. 2 is a front end elevation. Fig. 3 is a rear end elevation. Fig. 4 is an outside top plan. Fig. 5 is a top view with the cover turned back to show the interior thereof. Fig. 6 is a central longitudinal section taken on the line X X of Fig. 4, and Fig. 7 is a central cross-section taken on the line Y Y of Fig. 4.

Similar figures of reference denote and refer to like parts throughout the several views.

1 represents the bottom, 2 and 3 the sides, 4 and 5 the ends, and 6 the lid, of the tub or tank forming the body of my machine. Near each corner of the tank, secured to the sides 2 and 3, are the four legs or supports 7, 8, 9, and 10 and to the lower ends of which are secured the angle-fasteners 11, 12, 13, and 14, by which the machine may be secured to a floor by screws or otherwise.

The rear end of the lid 6 is attached at the rear end of the machine to the end 5 by the hinges 15 and 16, so that the lid may be turned back, as shown in Fig. 5.

To the rear end 5 of the tank I provide a pocket 17, substantially as shown, and in the side 3 near its lower center I provide an exhaust-hole, in which is fitted a removable plug 18, and underneath this I provide a spout 19.

Secured to the under side of bottom 1 at rear end, extending out at either side beyond the sides 2 and 3 and extending beyond to the rear, forming the bottom of the pocket 17, is the plate 20.

I provide a presser-receptacle 21, composed of four sides and a bottom, the latter being perforated and corrugated, forming ridges, as shown. The presser-receptacle 21 is smaller than the tank and is adapted to be suspended therein, with ample space between the sides and bottoms of the tub and the presser-receptacle. The presser-receptacle is suspended in the tank by the springs 22 and 23, which springs are secured at their outer ends to the top edge of the ends 4 and 5 of the tub, and then extend downwardly between the tub and the presser-receptacle and are secured to the lower edges of the center portions of the latter by the clips 24 and 25, by which arrangement the presser-receptacle is suspended in the tub, as shown in the drawings. Adapted to fit in the presser-receptacle 21 is the presser 26, with its downward face formed to correspond with the bottom of presser-receptacle 21 and provided with a perforated and corrugated surface. Secured in the center of the top of the presser 26 is an upwardly-extending post 27, which projects through an opening in the center of the lid 6. The upper end of the post 27 is provided with a hand-bolt 28. The post 27 is also provided with holes 29, as shown. Secured to the lid 6 on either side of the post 27 are the hangers 30, provided with corresponding holes of same size as the holes 29, and the holes 29 are each one at a time adapted to be brought into alinement with the holes in the hangers 30.

31 represents a pin to pass through the holes in the hangers 30 and through either of the holes 29, by which the presser 26 can be suspended at the desired distance from the presser-receptacle 21, and 32 represents a spring secured in the lid 6 and adapted to press against the pin 31 to prevent the pin 31 from working out of the holes 29. Secured to the lower edges of the center of the sides of the presser-receptacle 21 are the hangers 33, with holes therethrough below the bottom of the presser-receptacle 21. Extending across underneath the presser-receptacle 21 and projecting through the hangers 33 is a bar 34. To the ends of the bar 34 are secured the yokes 35 and 36, which then pass upward through the openings 37 and 38 in the sides of the lid 6 considerably beyond, then outward, and thence downward, where each is provided with an outwardly-projecting axle 39 and 40.

41 is the operating-handle, with curved arms 42 and 43 extending from either end across the axles 39 and 40, to which they are pivotally secured, and then projecting to the rear end of the machine, where they are secured to the plate 20 by the long link-couplings 44 and 45. Secured to the plate 20 are the springs 46 and 47, which extend in a curve first rearward then upward and forward, where the ends are pivotally secured to the axles 39 and 40. These springs are adapted to raise the presser 26 to its highest point and to return it thereto after it has been depressed. Mounted on the top of the center of the lid 6, at the front end thereof, is a device for securing the lid closed consisting of a bolt 51, secured in place and operative by the members 48, 49, 50, 52, 53, 54, and 55, which parts I am aware are old.

Secured in the center of the handle 41 is a block 56, through which is a hole, to which may be attached the reciprocating rod of a wind-engine or other mechanical power for operating the machine.

The operation of the machine is as follows: The lid 6, together with the presser 26, is raised up and turned back, as shown in Fig. 5, and the material to be washed is then placed in the receptacle 21. A sufficient amount of water is then placed in the tank to immerse the material. The lid 6 is then closed and locked, as in Fig. 1, which brings the material between the two corrugated surfaces of the presser-receptacle 21 and the presser 26, the latter resting on the material, and the pin 31 is then put through the holes in the hangers 30 and also through the most convenient hole 29. The handle 41 is then moved up and down either by hand or mechanical power, which operation will force the water through the perforations at different angles and through the materials being washed, which will effectually cleanse the material with the exertion of a minimum of power. It will be seen that the machine is simple and comparatively inexpensive in construction and that it is capable of rapidly effecting the operation of washing without liability of injury to the fabrics being operated on.

My invention is perfectly adapted to accomplish the results for which it is intended, and it is evident that changes in and modifications of the specific construction herein shown and described may be made without departing from the spirit of my invention or sacrificing any of its many advantages, and the specific construction of the details of my washing-machine, in which novel features are embodied, may be variously changed without altering the essential principles which are claimed as new.

Having now fully shown and described my invention and the best mode for its construction to me known at this time, what I claim as new, and desire to secure by Letters Patent of the United States, is—

1. In a washing-machine the combination of an oblong tank, a hinged cover thereon, a presser-receptacle located in said tank and provided with hangers 33 and clips 24 and 25, springs 22 and 23 secured to the ends of the tank and to the said clips, a presser rigidly suspended from said cover and extending into the presser-receptacle, a shaft mounted in said hangers, yokes 35 and 36 pivotally connected with said shaft and extending over the sides of the tank, said yoke being provided with axles at their outer ends, springs connected to said axles and to said tank, and a pair of arms pivotally connected to said axles and to said tank and connected at their outer ends by a handle.

2. In a washing-machine the combination of an oblong tank, a presser-receptacle in said tank provided with hangers 33, springs 22 and 23 attached to the upper edge of the tank and the lower part of the receptacle, the shaft 34 mounted in said hangers and extending across the under side of the presser-receptacle, a presser extending into the presser-receptacle, means for vertically adjusting said presser and means for vertically reciprocating said shaft.

3. In a washing-machine the combination of an oblong tank, a hinged cover thereon, a presser-receptacle located in said tank and provided with hangers 33 and clips 24 and 25, springs 22 and 23 secured to the ends of the tank and to the said clips, a shaft mounted in said hangers, yokes 35 and 36 pivotally connected with said shaft and extending over the sides of the tank, said yokes being provided with axles at their outer ends, springs connected to said axles and to said tank, a pair of arms pivotally connected to said axles and to said tank and connected at their outer ends by a handle, a presser in the presser-receptacle, the post 27 secured to presser 26 and extending upward through and beyond the cover 6 and means whereby said post may be secured to the cover at the point desired, all substantially as shown and described.

In testimony whereof I have hereunto signed my name in the presence of two subscribing witnesses.

THOMAS H. C. BEALL.

Witnesses:
F. L. KIEFER,
P. J. FARISS.